(12) United States Patent
Zimmermann et al.

(10) Patent No.: US 8,745,572 B2
(45) Date of Patent: Jun. 3, 2014

(54) SOFTWARE DEVELOPMENT AUTOMATED ANALYTICS

(75) Inventors: Thomas M. J. Zimmermann, Bellevue, WA (US); Christian A. Bird, Bellevue, WA (US); Nachiappan Nagappan, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 300 days.

(21) Appl. No.: 13/165,811

(22) Filed: Jun. 22, 2011

(65) Prior Publication Data

US 2012/0331439 A1 Dec. 27, 2012

(51) Int. Cl.
*G06F 9/44* (2006.01)

(52) U.S. Cl.
USPC ............................ 717/101; 717/105; 717/113

(58) Field of Classification Search
USPC .................. 717/101–113, 138–140, 170; 714/38.1–46
See application file for complete search history.

(56) References Cited

U.S. PATENT DOCUMENTS

| 5,606,669 | A | 2/1997 | Bertin et al. |
| 6,026,362 | A | 2/2000 | Kim et al. |
| 6,285,999 | B1 | 9/2001 | Page |
| 6,339,776 | B2 | 1/2002 | Dayani-Fard et al. |
| 6,763,360 | B2 | 7/2004 | Hartley |
| 6,907,546 | B1 * | 6/2005 | Haswell et al. ............ 714/38.11 |
| 6,931,328 | B2 | 8/2005 | Braig et al. |
| 6,983,466 | B2 | 1/2006 | Charisius et al. |
| 7,003,560 | B1 | 2/2006 | Mullen et al. |
| 7,051,316 | B2 | 5/2006 | Charisius et al. |
| 7,117,144 | B2 | 10/2006 | Goodman et al. |
| 7,162,694 | B2 | 1/2007 | Venolia |
| 7,171,646 | B2 | 1/2007 | Charisius et al. |
| 7,185,290 | B2 | 2/2007 | Cadiz et al. |
| 7,266,805 | B2 | 9/2007 | Weidman et al. |
| 7,305,399 | B2 | 12/2007 | Keith, Jr. |
| 7,318,216 | B2 * | 1/2008 | Diab ............................. 717/108 |
| 7,398,469 | B2 | 7/2008 | Kisamore et al. |
| 7,418,697 | B2 | 8/2008 | Gryko et al. |
| 7,721,250 | B2 | 5/2010 | Anand et al. |
| 7,739,653 | B2 | 6/2010 | Venolia |
| 7,743,360 | B2 | 6/2010 | Venolia |
| 2002/0023257 | A1 | 2/2002 | Charisius et al. |
| 2002/0032900 | A1 | 3/2002 | Charisius et al. |
| 2002/0087950 | A1 | 7/2002 | Brodeur et al. |
| 2002/0180689 | A1 | 12/2002 | Venolia |
| 2002/0186257 | A1 | 12/2002 | Cadiz et al. |
| 2002/0188448 | A1 | 12/2002 | Goodman et al. |

(Continued)

OTHER PUBLICATIONS

Buse, Raymond PL, and Thomas Zimmermann. "Analytics for software development." Proceedings of the FSE/SDP workshop on Future of software engineering research. ACM, 2010, pp. 77-80.*

(Continued)

*Primary Examiner* — Satish Rampuria
(74) *Attorney, Agent, or Firm* — Dan Choi; Carole Boelitz; Micky Minhas (57) ABSTRACT

The discussion relates to software development automated analytics. One example can access a database related to a software development project. The database can include both software code and non-code metadata. The example can analyze the non-code metadata and the software code to identify parameters. It can relate the parameters to aspects of the software development project. The example can cause a graphical user interface to be presented that conveys an individual aspect.

17 Claims, 9 Drawing Sheets

(56) References Cited

U.S. PATENT DOCUMENTS

| | | | |
|---|---|---|---|
| 2003/0164862 | A1 | 9/2003 | Cadiz et al. |
| 2005/0204343 | A1 | 9/2005 | Kisamore et al. |
| 2006/0136904 | A1 | 6/2006 | Weidman et al. |
| 2007/0011649 | A1* | 1/2007 | Venolia ............ 717/101 |
| 2007/0011659 | A1* | 1/2007 | Venolia ............ 717/127 |
| 2007/0261036 | A1 | 11/2007 | Drake et al. |
| 2008/0059942 | A1* | 3/2008 | Brown et al. ......... 717/101 |
| 2009/0083268 | A1 | 3/2009 | Coqueret et al. |
| 2010/0211924 | A1 | 8/2010 | Begel |
| 2011/0040808 | A1 | 2/2011 | Joy et al. |

OTHER PUBLICATIONS

Trkman et al., The impact of business analytics on supply chain performance, Elsevier, Decision Support Systems 49 (2010), pp. 318-327.*
Telea et al., Visual software analytics for the build optimization of large-scale software systems, Springer 2011, pp. 635-654.*
Alkhateeb, F., "Querying RDF(S) with Regular Expressions", PhD thesis, Joseph Fourier University of Grenoble, Jun. 2008, pp. 169.
Anvik, et al., "Who should Fix this Bug?", Proceedings of the 28th international conference on Software engineering, May 20-28, 2006, pp. 10.
Aranda, et al., "The Secret Life of Bugs: Going Past the Errors and Omissions in Software Repositories", Microsoft Research Publications, May 2009, pp. 1-31.
Ashok, et al., "Debugadvisor: A Recommender System for Debugging", Microsoft Research Publications, Aug. 26, 2009, pp. 10.
Begel, et al., "Codebook: Social Networking over Code", Microsoft Research Publications, Jun. 2009, pp. 4.
Begel, et al., "Coordination in Large-Scale Software Teams", Microsoft Research Publications, May 2009, pp. 7.
Cadiz, J.J. et al.; "Designing and Deploying an Information Awareness Interface"; Proceedings of the 2002 ACM Conference on Computer Supported Cooperative Work; Aug. 20, 2002; pp. 314-323.
Canfora, et al., "Ldiff: an Enhanced Line Differencing Tool", Proceedings of the 31$^{st}$ International Conference on Software Engineering, May 16-24, 2009, pp. 595-598.
Cataldo, et al., "2$^{nd}$ International Workshop on Socio-Technical Congruence", Proceedings of the 2009 31$^{st}$ International Conference on Software Engineering: Companion Volume, May 16-24, 2009, pp. 476-477.
Cataldo, et al., "Socio-Technical Congruence: A Framework for Assessing the Impact of Technical and Work Dependencies on Software Development Productivity", Proceedings of the Second ACM-IEEE international symposium on Empirical software engineering and measurement, Oct. 9-10, 2008, pp. 1-20.
Cataldo, et al. "Identification of Coordination Requirements: Implications for the Design of Collaboration and Awareness Tools", Proceedings of the 2006 20$^{th}$ anniversary conference on Computer supported cooperative work, Nov. 4-8, 2006, pp. 353-362.
Cencini, A., "SQL Server 2005 Full-Text Search: Internals and Enhancements", MSDN, Dec. 2003, pp. 1-17.
Consens, et al., "Visualizing and Querying Software Structures", Proceedings of the 14$^{th}$ international conference on Software engineering, May 11-15, 1992, pp. 138-156.
Čubranić,, D. et al.; "Hipikat: A Project Memory for Software Development"; IEEE Transactions on Software Engineering; vol. 31, No. 6; Jun. 2005; pp. 446-465.
Čubranić, D. et al.; "Hipikat: Recommending Pertinent Software Development Artifacts"; Department of Computer Science, University of British Columbia, 201-2366 Main Mall, Vancouver BC, Canada V6T 1Z4; 2003; pp. 1-12.
De Souza, et al., "Seeking the Source: Software Source Code as a Social and Technical Artifact", Proceedings of the 2005 international ACM SIGGROUP conference on Supporting group work, Nov. 6-9, 2005, pp. 10.
De Souza, et al., "An Empirical Study of Software Developers' Management of Dependencies and Changes", Proceedings of the 30$^{th}$ international conference on Software engineering, May 10-18, 2008, pp. 241-250.

Dumais, S.; "Beyond Content-Based Retrieval: Modeling Domains, Users, and Interaction"; http://research.microsoft.com/~sdumais; May 21, 1998; pp. 1-45.
Dumais, S. et al.; "Stuff I've Seen: A System for Personal Information Retrieval and Re-Use"; Microsoft Research, One Microsoft Way, Redmond, WA 98052 USA; Aug. 1, 2003; pp. 1-8.
Fremuth-Paeger; "GOBLIN: A Graph Object Library for Network Programming"; http://www.math.uni-augsburg.de/opt/goblin.html; May 20, 2005; pp. 1-13.
Hassan, A., "The Road ahead for Mining Software Repositories", In Proceedings of the Future of Software Maintenance at the 24$^{th}$ IEEE International Conference on Software Maintenance, 2008. pp. 10.
Hinds, et al., "Structures that Work: Social Structure, Work Structure and Coordination Ease in Geographically Distributed Teams", Proceedings of the 2006 20$^{th}$ anniversary conference on Computer supported cooperative work, Nov. 4-8, 2006, pp. 343-352.
Holmes, et al., "Deep Intellisense: A Tool for Rehydrating Evaporated Information", Proceedings of the 2008 international working conference on Mining software repositories, May 10-11, 2008, pp. 4.
Huang, et al., "Mining Version Histories to Verify the Learning Process of Legitimate Peripheral Participants", International Conference on Software Engineering, Proceedings of the 2005 international workshop on Mining software repositories, May 2005, pp. 1-5.
Kagdi, et al., "A Survey and Taxonomy of Approaches for Mining Software Repositories in the Context of Software Evolution", Journal of Software Maintenance and Evolution: Research and Practice, vol. 19, Issue 2, Mar. 2007, pp. 77-131.
Kaiser, G. et al.; "An Architecture for Intelligent Assistance in Software Development"; Proceedings of the 9th International Conference on Software Engineering; 1987; pp. 1-9.
Kanellos, M.; "Microsoft Aims for Search on Its own Terms"; http://news.com.com/Microsoft+aims+for+search+on+its+own+terms/2001-1008_3-5110910.html; Nov. 24, 2003; pp. 1-4.
Kiefer, et al., "Mining Software Repositories with ISPARQL and a Software Evolution Ontology", Proceedings of the 29$^{th}$ International Conference on Software Engineering Workshops, May 20-26, 2007, pp. 8.
Kochut, et al., "SPARQLeR: Extended Sparql for Semantic Association Discovery", Proceedings of the 4$^{th}$ European conference on The Semantic Web: Research and Applications, Jun. 3-7, 2007, pp. 1-15.
Mathys, Y.; "A Graph Browser for Large Directed Graphs"; Motorola Inc. Semiconductor Systems Design Technology; 1992; pp. 1-6.
Mockus, et al., "Expertise Browser: A Quantitative Approach to Identifying Expertise", Proceedings of the 24$^{th}$ International Conference on Software Engineering, May 19-25, 2002, pp. 503-512.
Ohira, et al., "Accelerating Cross-Project Knowledge Collaboration Using Collaborative Filtering and Social Networks", ACM SIGSOFT Software Engineering Notes; vol. 30, Issue 4, Jul. 2005, pp. 111-115.
Perforce; "The Perforce SCM System"; http://www.perforce.com/perforce/products.html; May 24, 2005; pp. 1-2.
"RDF Primer", Retrieved at << http://www.w3.org/TR/REC-rdf-syntax/ >>, W3C, Editor—Dave Beckett, Feb. 10, 2004, pp. 1-32.
Runeson, et al., "Detection of Duplicate Defect Reports using Natural Language Processing", Proceedings of the 29$^{th}$ international conference on Software Engineering, May 20-26, 2007, pp. 10.
Saul, et al., "Recommending Random Walks", Proceedings of the 6$^{th}$ joint meeting of the European software engineering conference and the ACM SIGSOFT symposium on the foundations of software engineering, Sep. 3-7, 2007, pp. 15-24.
Schneider, et al. "Mining a Software Developer's Local Interaction History", In Proceedings of the International Workshop on Mining Software Repositories, 2004, pp. 5.
Siracusa; "Mac OS X 10.0"; arstechnica; http://arstechnica.com/reviews/01q2/macos-x-fina/macos-x-10.html; May 20, 2005; pp. 1-6.
"SPARQL Query Language for RDF", W3C, Editors—Eric Prud'hommeaux & Andy Seaborne, Jan. 15, 2008, pp. 1-66.
Sullivan, T.; "Microsoft Researchers Discuss Forthcoming End-User .NET Functionality"; http://www.infoworld.com/articles/hn/xml/01/09/05/010905hnmsfuture.html; Sep. 5, 2001; pp. 1-4.
Tarvo, A., "Mining Software History to Improve Software Maintenance Quality: A Case Study", IEEE Software, vol. 26, Issue 1, Jan. 2009, pp. 34-40.

(56) References Cited

OTHER PUBLICATIONS

Trainer, et al., "Bridging the Gap between Technical and Social Dependencies with Ariadne", Proceedings of the 2005 OOPSLA workshop on Eclipse technology eXchange, Oct. 16-17, 2005, pp. 26-30.

Valetto, et al., "Using Software Repositories to Investigate Sociotechnical Congruence in Development Projects", Proceedings of the Fourth International Workshop on Mining Software Repositories, May 20-26, 2007, pp. 4.

Venolia, G., "Textual Allusions to Artifacts in Software-Related Repositories", Proceedings of the 2006 international workshop on Mining software repositories, May 22-23, 2006, pp. 151-154.

Venolia, G. et al.; "Understanding Sequence and Reply Relationships within Email Conversations: A Mixed-Model Visualization"; Technical Report, MSR-TR-2002-102, Revised Jan. 13, 2003; Sep. 23, 2002; pp. 1-9.

Veras, et al., "Comparative Study of Clustering Techniques for the Organization of Software Repositories", Proceedings of the 7$^{th}$ International Conference on Hybrid Intelligent Systems, Sep. 17-19, 2007, pp. 372-377.

Wood, et al., "Toward a Software Maintenance Methodology using Semantic Web Techniques", Proceedings of the Second International IEEE Workshop on Software Evolvability, Sep. 24, 2006, pp. 8.

www.Technewsworld.com; "Search Beyond Google"; Posted to addict3d.org; Feb. 3, 2004; pp. 1-10.

Yurko, C.; "Search the Web Without Searching: Kenjin analyzes your documents and finds what you need on the Web, with surprising accuracy."; PC World; Feb. 11, 2000; pp. 1-2.

Zhang, et al., "Mining Software Repositories to Understand the Performance of Individual Developers", Proceedings of the 31$^{st}$ Annual International Computer Software and Applications Conference; vol. 1, Jul. 24-27, 2007, pp. 2.

Zimmermann, et al., "Mining Version Histories to Guide Software Changes", Proceedings of the 26th International Conference on Software Engineering, May 23-28, 2004, pp. 1-10.

Hindle, Abram, "Software Process Recovery: Recovering Process from Artifacts", Retrieved at <<http://ieeexplore.ieee.org/stamp/stamp.jsp?tp=&arnumber=5645491>>, 17th Working Conference on Reverse Engineering, Oct. 13-16, 2010, pp. 305-308.

Lucia, et al., "Traceability Mangement for Impact Analysis", Retrieved at <<http://ieeexplore.ieee.org/stamp/stamp.jsp?tp=&arnumber=4659245>>, Frontiers of Software Maintenance, Sep. 28-Oct. 4, 2008, pp. 21-30.

Brun, et al., "Speculative Analysis: Exploring Future Development states of Software", Retrieved at <<http://www.google.co.in/url?sa=t& source=web&cd=1&ved=0CBYQFjAA&url=http%3A%2F%2Fciteseerx.ist.psu.edu%2Fviewdoc%2Fdownload%3Fdoi%3D10.1.1.173.1319%26rep%3Drep1%26type%3Dpdf&ei=t22ITffXA5LF8QPqhsC5Dw&usg=AFQjCNFrzKsVw0wmjX94zVGbIXSsIUtLHA>>, Workshop on the Future of Software Engineering Research, Nov. 7-8, 2010, pp. 5.

Buse, et al., "Information Needs for Software Development Analytics", Retrieved at <<http://research.microsoft.com/pubs/144543/MSR-TR-2011-8.pdf>>, Jan. 30, 2011, pp. 1-16.

U.S. Appl. No. 12/714,522 published as 2010/0211924 A1, Including all Office Actions, filed date Feb. 28, 2010, Andrew Begel.

U.S. Appl. No. 11/175,568 Published as 2007/0011659 A1 and Granted as 7,739,653, including all Office Actions, filed Jul. 5, 2005, Gina D. Venolia.

U.S. Appl. No. 11/175,570 Published as 2007/0011649 A1 and Granted as 7,743,360, including all Office Actions, filed Jul. 5, 2005, Gina D. Venolia.

"Eclipse Metrics plugin", Retrieved at <<http://sourceforge.net/p/metrics/news/?page=0 >> and <<http://sourceforge.net/p/metrics/news/?page=1>>, 2013, SourceForge, 5 pages.

Wilcox, Glen, "Managing Your Dependencies with JDepend", Retrieved at <<http://www.onjava.com/pub/a/onjava/2004/01/211jdepend.html>>, Jan. 21, 2004, 3 pages.

"Metrics 1.3.5—Getting started", Retrieved at <<http://web.archive.org/web/20050703020346/http:/metrics.sourceforge.net/>>, Wayback Machine, SourceForge.net, Jul. 3, 2005, 9 pages.

"Metrics 1.3.6—Getting started", Retrieved at <<http://web.archive.org/web/20100214223536/http:/metrics.sourceforge.net/>>, Wayback Machine, SourceForge.net, Feb. 14, 2010, 10 pages.

\* cited by examiner

SOFTWARE DEVELOPMENT AUTOMATED ANALYTICS

BACKGROUND

Making decisions in software development is often difficult because stakeholders often do not have all the information that they desire for a well-informed decision. For example, the stakeholder may not have information about which parts of a software system should be tested because the parts had high numbers of bugs in the past. Another example can relate to the fact that the stakeholder does not know the impact of distributed development on the quality of a software system. Such examples can broadly be summarized as analytics questions.

SUMMARY

The discussion relates to automated software development analytics. One implementation can access a database related to a software development project. The database can include both software code and non-code metadata. The implementation can analyze the non-code metadata and the software code to identify parameters. It can relate the parameters to aspects of the software development project. The implementation can cause a graphical user interface to be presented that conveys an individual aspect.

The above listed example is intended to provide a quick reference to aid the reader and is not intended to define the scope of the concepts described herein.

BRIEF DESCRIPTION OF THE DRAWINGS

The accompanying drawings illustrate implementations of the concepts conveyed in the present patent. Features of the illustrated implementations can be more readily understood by reference to the following description taken in conjunction with the accompanying drawings. Like reference numbers in the various drawings are used wherever feasible to indicate like elements. Further, the left-most numeral of each reference number conveys the figure and associated discussion where the reference number is first introduced.

DETAILED DESCRIPTION

Overview

This discussion relates to automated analytics for software development projects. The automated analytics can provide users (e.g., stakeholders) with access to data and enable the user to make a wide variety of informed decisions regarding a software development project. Further, the automated analytics can sort through program code and non-code metadata and identify aspects of the software development project for the user. An aspect can be anything related to the software development project that the user may want to know about when making decisions about the software development project. One or more aspect presentation options can be made available to the user that can convey the aspect(s) to the user.

FIRST SCENARIO EXAMPLE

Figure 1:
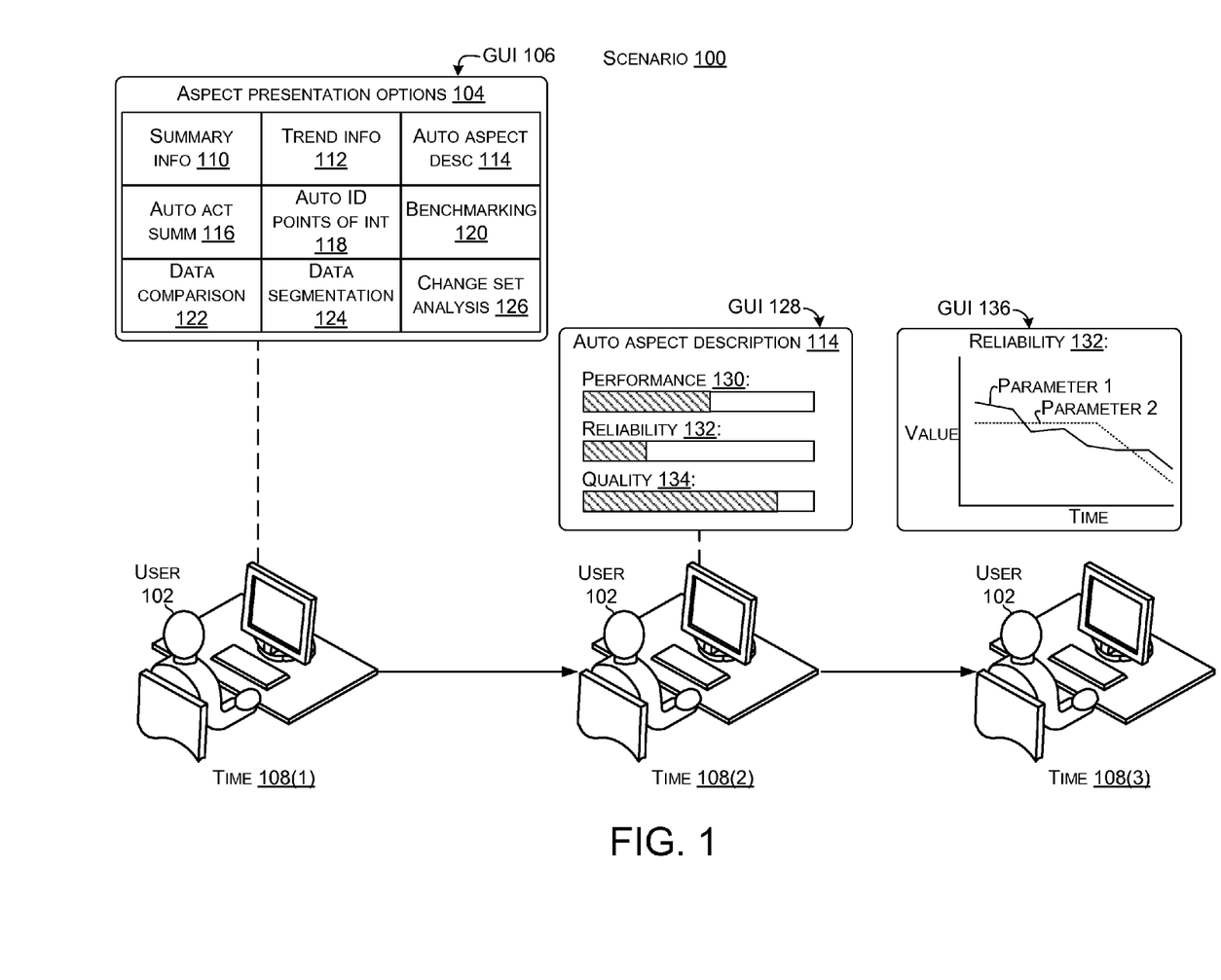
FIG. 1 shows an example software project development scenario in which the present concepts can be employed in accordance with some implementations.

For purposes of explanation consider introductory FIG. 1 that shows a software project development scenario 100. In this scenario, assume that a user (e.g., stakeholder) 102 is interested in making informed decisions about a software development project. A software development project can relate to developing an application or an operating system or to developing multiple subsequent versions of an operating system or an application.

The software development project can be characterized via one or more aspects. Aspects are described below by way of example, but briefly, aspects can be thought of as projects, people, binaries, components, files, classes, methods, change sets (patches), and/or any information derived about existing aspects, among others. Some or all of the aspects can be readily available via user-selectable aspect presentation options 104 so that the user can make informed decisions regarding the software development project.

In some configurations, the aspect presentation options 104 can be presented to the user on a graphical user interface (GUI) 106. In the present example, at initial point or time 108(1) nine aspect presentation options 104 are offered to the user as summary information 110, trend information 112, automatic aspect description 114, automatic activity summarization 116, automatic identification of points of interest 118, benchmarking 120, data comparison 122, data segmentation 124, and change set analysis 126. Some of these aspect presentation options will be described in more detail below. (The specific examples and/or the number of examples of aspects and/or aspect presentation options are provided for purposes of explanation and are not intended to be limiting). For purposes of explanation, assume that the user selects to investigate an aspect(s) with the automatic aspect description 114.

Subsequent time 108(2) shows the automatic aspect description 114 presented to the user as a graphical representation on a graphical user interface (GUI) 128. In this case, the automatic aspect description conveys values of three aspects; a performance aspect 130, a reliability aspect 132, and a quality aspect 134. The performance aspect can relate to how portions of the software code or all of the software code are performing. The reliability aspect can relate to failures or downtime of the software code. The quality aspect can relate to errors or defects associated with the software code.

Assume for purposes of explanation, that the user is interested in the reliability aspect 132. In this scenario the user can select the reliability aspect 132, such as by clicking on reliability aspect portion of GUI 128.

Further time 108(3) shows a subsequent GUI 136 of the reliability aspect 132. This GUI 136 shows two parameters (first parameter and second parameter) that are graphed as a function of parameter value over time. The first and second parameters can be thought of as parameters that contribute to the reliability aspect. For example, the first parameter could relate to a number of instances of the program being non-responsive (e.g., blue screen) per hour of operation. The second parameter could relate to a number of errors produced per use, for example. (The illustration of two parameters is for purposes of explanation and one, or more than two parameters, may be associated with an aspect).

The term "parameter" is used broadly to cover any information that may be useful in understanding an aspect of the software development project. Many parameters may be thought of as metrics. For instance, the amount of churn per unit time can be an example that can be used as a parameter. Churn can be thought of as revisions to a piece of software code. So churn per unit time can be thought of as how often a particular piece of the software code is revised. The term parameter can also include things that might not be considered metrics. For instance, inter-relationships can be parameters. For example, in previous versions of the software code, file 25 may have been linked to file 50, but in a new version file 25 is linked to file 100. This can be thought of as a parameter value change that may be useful information to the user, either alone or when considered with other parameters. To summarize, the term "parameter" can refer to some type of measurement or analysis of the raw data in a data warehouse associated with the software development project, whether this be a quantitative metric, a categorization, a nominal value, or something else.

The user can utilize the information conveyed in GUI's 128 and 136 to make an informed decision about the software development project. For instance, in a case where the user is a software development manager, the user may provide instructions to software developers to make changes that will improve the parameter values conveyed in GUI 136. Alternatively, if the user wants more information about other aspects of the software development project the user can return to the aspect presentation options 104 conveyed on GUI 106. Thus, scenario 100 can quickly and easily provide information to the user that can allow the user to make informed decisions regarding several aspects of the software development project.

FIRST SYSTEM ARCHITECTURE EXAMPLE

Figure 2:
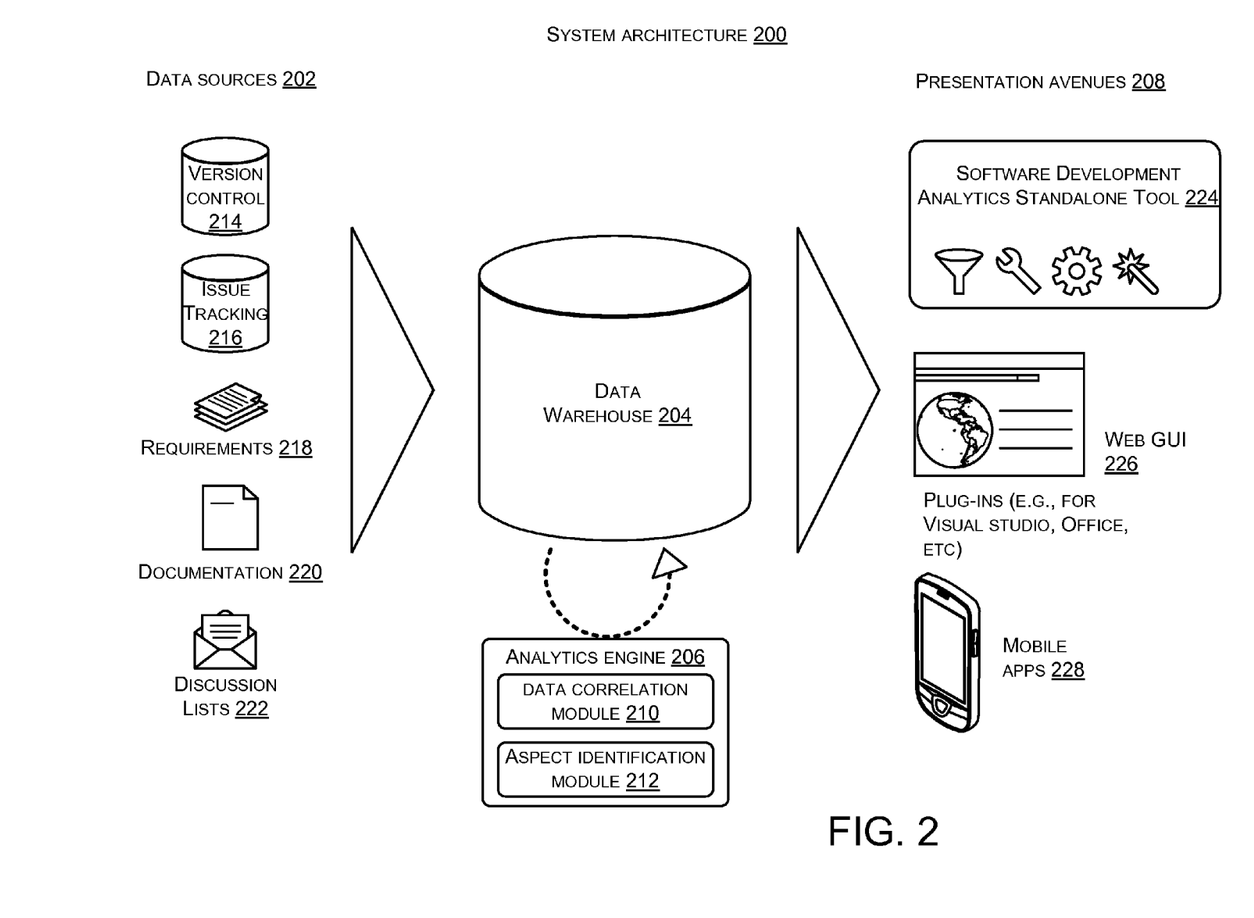
FIG. 2 shows an example system architecture for accomplishing automated software project development analytics in accordance with some implementations of the present concepts.

FIG. 2 shows a system architecture 200 in which software project analytics can be employed. In this case, various data sources 202 that relate to a software development project can be accessed. Data from the data sources 202 can be populated into a database or data warehouse 204. The data can be populated into the data source on an on-going basis, such as continually, periodically, or from time to time. An analytics engine 206 can analyze the data in the data warehouse 204 to detect useful information. The analytics engine can then present the useful information to the user as indicated by the presentation avenues 208.

In one configuration, the analytics engine 206 can include a data correlation module 210 and an aspect identification module 212, which will be discussed below. Further, in the illustrated configuration, examples of data sources 202 can include version control 214, issue tracking 216, requirements 218, documentation 220, and discussion or mailing lists 222. These data sources can be derived from artifacts that are created during the natural course of software development. For instance, requirements contain the pieces of functionality that software must contain for it to be considered complete and these are created at the beginning of a software project. The requirements for a project dictate the planning and actual development work that goes on. The version control data source contains the actual source code changes and metadata (such as who made the changes, when they were made, and messages associated with the changes) that occurred during the course of the project. Documentation may be actual user documentation for the user of the software project or may be documentation intended for project stakeholders such as design and planning documents, documents containing the structure of the software system, or documents regarding the process of the project (e.g. the testing plan). The issue tracking data source contains information related to problems in the system (also known as bugs) that have been identified by users and testers and which may need to be corrected before the project is complete. The discussion list data source may contain emails, online chats, or any other form of recorded electronic communication between project stakeholders.

Examples of presentation avenues 208 include a software development analytics standalone tool 224, a web GUI 226, and mobile applications 228. From another perspective, presentation avenues can be thought of as part of a larger decision support system and also as part of an IDE (Integrated Development Environment) like Visual Studio. (The specific examples and/or the number of examples of data sources and presentation avenues are provided for purposes of explanation and are not intended to be limiting).

The data correlation module 210 can correlate data from different sources (both program code sources and metadata (e.g., non-code sources)) in the data warehouse 204. For instance, the data correlation module can identify instances of parameters in either or both of the source code and non-code sources. In some implementations, the data correlation module can serve to identify related parameters. For instance, if an increase in dependencies is related to an increase in failed software tests, the data correlation module could point out this relationship to the user or the user could ask explicitly about relationships between parameters.

The aspect identification module 212 can detect trends in the data, summarize the data, identify points of interest, and/or pre-compute insights associated with the data. For instance, the aspect identification module can be configured to relate individual parameters to aspects of the software development project. For example, the aspect identification module can be configured to detect an instance where changes to values of an individual parameter are indicative of a change to an individual aspect. The aspect identification module can be further configured to cause the change to the individual aspect to be surfaced or presented on one of the presentation avenues 208. Viewed from one perspective, in some instances an aspect can be a domain of analytics information such as testing, source code change, organization, process, etc. Each of these has a number of different parameters that could be presented and/or analyzed. For instance, the aspect identification module could monitor organizational data and alert a manager if too many inexperienced engineers are making changes to core code within an OS (the parameter here would be a count of the number of inexperienced people changing each component in the system). The aspect information can be presented as graphs, charts, tables, keywords, etc. Examples of such presentations are described above relative to FIG. 1 and below relative to FIGS. 5-8.

SYSTEM EXAMPLE

Figure 3:
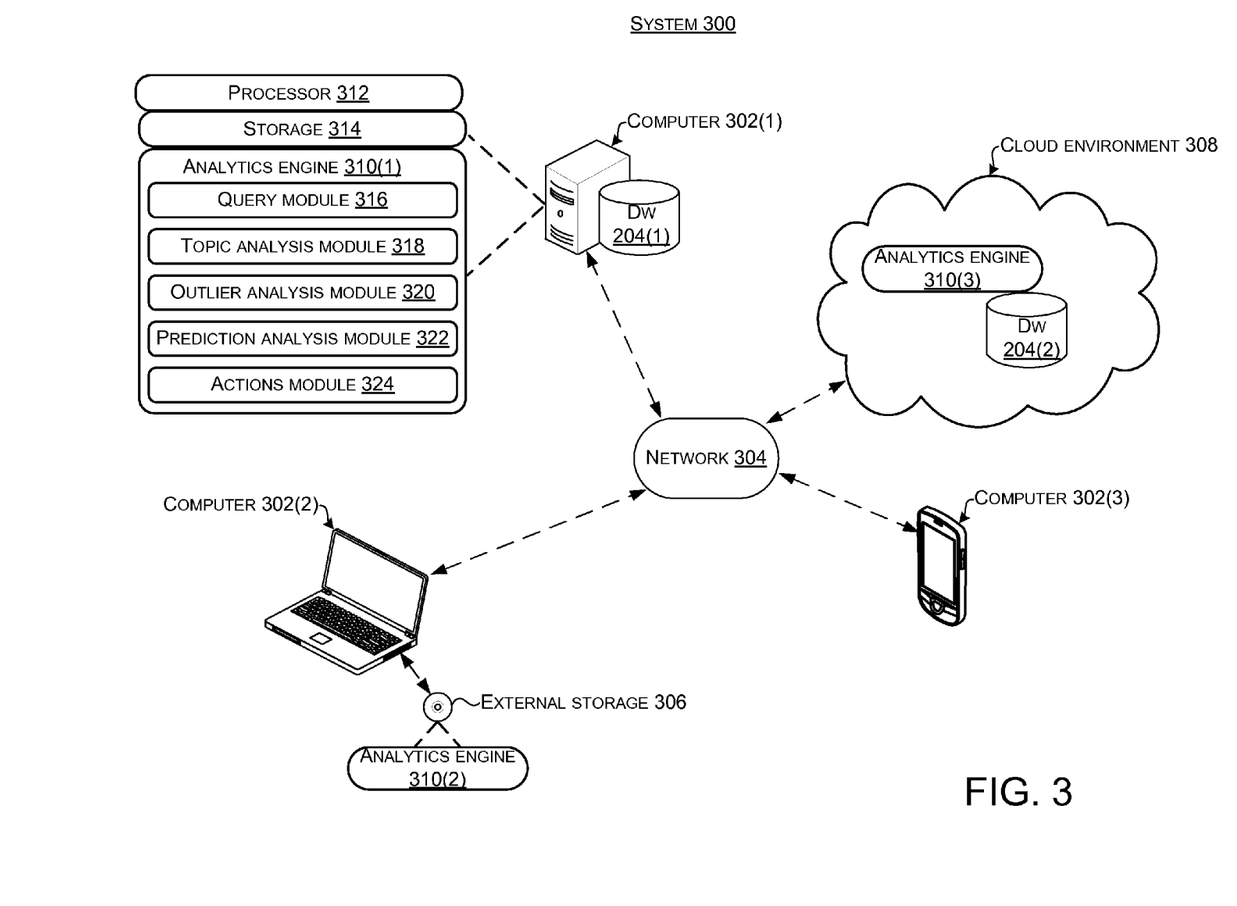
FIG. 3 shows an example of a system upon which automated software project development analytics can be accomplished in accordance with some implementations of the present concepts.

FIG. 3 shows a system 300 which can implement software project analytics. For purposes of explanation, three computing devices or computers 302(1), 302(2), and 302(3) are illustrated. In some cases parentheticals are utilized after a reference number to distinguish like elements. Use of the reference number without the associated parenthetical is generic to the element.

In this case, computer 302(1) is manifest as a desktop computer or server, computer 302(2) is manifest as a notebook computer and computer 302(3) is manifest as a smart phone type computer. The term "computer" or "computing device" as used herein can mean any type of device that has some amount of processing capability. While specific examples of computers are illustrated for purposes of explanation, other examples of such computers can include traditional computing devices, such as personal computers, cell phones, smart phones, personal digital assistants, or any of a myriad of ever-evolving or yet to be developed types of devices. Further, a system can be manifest on a single device or distributed over multiple devices.

Individual computers 302 can exchange data over a network 304. Alternatively or additionally, data may be exchanged directly between two computers, such as via a USB protocol or can be exchanged via a storage media or external storage 306. Individual computers can function in a stand-alone or cooperative manner to achieve software project analytics functionalities. For instance, part of a functionality offered on a computer may be performed on the computer and part may be performed on another computer and/or in the cloud environment 308. As used herein, the cloud environment 308 refers to computing resources and/or computing functionalities that can be accessed over network 304, though the location of these computing resources may not be readily apparent. System 300 also includes two instances of data warehouse 204. In the first instance, data warehouse 204(1) is associated with computer 302(1). The second instance of the data warehouse 204(2) is cloud based. (While two data warehouses are illustrated in system 300 for purposes of explanation, some configurations can employ only a single data warehouse associated with a software development project.)

A multitude of different manifestations can be created to configure a computer 302 to accomplish software project analytics concepts. For instance, individual computers (as well as cloud environment 308) can include an analytics engine 310 configured to accomplish some or all of the software project analytics concepts on behalf of themselves or at the request of another computer or another analytics engine. For instance, an individual analytics engine may not offer a full functionality and/or may be able to obtain limited computing resources and as such may request another analytics engine to perform a functionality on its behalf.

The example provided by computer 302(1) is now described in more detail. Some or all of the elements described relative to computer 302(1) can be applicable to other computers of system 300, but are not described in great detail for sake of brevity. In this case, computer 302(1) includes an analytics engine 310(1), processor(s) 312, and storage 314, among others. Further, in this example, the analytics engine 310(1) can include a query module 316, a topic analysis module 318, an outlier analysis module 320, a prediction analysis module 322, and an actions module 324.

Processor 312 can execute data in the form of computer-readable instructions to provide a functionality, such as a software project analytics functionality. Data, such as computer-readable instructions can be stored on storage 314 and/or external storage 306. The storage 314 can include any one or more of volatile or non-volatile memory, hard drives, and/or optical storage devices (e.g., CDs, DVDs etc.), among others.

Computers 302 can also be configured to receive and/or generate data in the form of computer-readable instructions from storage 306 that for sake of explanation can be thought of as external storage media. Examples of external storage media can include optical storage devices (e.g., CDs, DVDs etc.), hard drives, and flash storage devices (e.g., memory sticks or memory cards), among others. The computers may also receive data in the form of computer-readable instructions over network 304 that is then stored on the computer (and/or on a storage device that is communicatively coupled with the computer) for execution by its processor.

Alternatively to the illustrated configuration of computer 302(1), the computers can employ a system on a chip (SOC) type design. In such a case, functionality provided by the computer can be integrated on a single SOC or multiple coupled SOCs. For instance, the computer can include shared resources and dedicated resources. An interface(s) can facilitate communication between the shared resources and the dedicated resources. As the name implies, dedicated resources can be thought of as including individual portions that are dedicated to achieving specific functionalities. Shared resources can be storage, processing units, etc. that can be used by multiple functionalities. For example, the shared resources can include input/output devices, such as a touch screen of the computer.

Looking at analytics engine 310(1), query module 316 can, automatically or at the request of the user, search the data warehouse 204 for specific content, such as words, phrases, numbers, etc. The results of the query can be directly displayed to the user or further analyzed with any of the other modules in the analytics engines. The query module can also correlate the query to individual aspects of the software development project. For example, if the user enters the query "bug" the query module can find instances of "bug" in the data warehouse. When instances of the query are located in the data warehouse, the query module can attempt to determine the context in which the query term is used. So for instance, the query module may determine that "bug" is a parameter that relates to a trends aspect of the software development project. In some implementations, the query module can relate trends of parameters to aspects of the software project in one of two ways. First, users may specify which aspects are related to the query (e.g. bug counts should be related to code churn). Second, an exhaustive search of parameters can be performed to identify which parameters of which aspects are related to the query term(s).

In another example, if the user selects the binary Foo.DLL in the user interface, the query module 316 can automatically retrieve all relevant information related to the binary Foo.DLL from the data warehouse. Such information includes but is not limited to code, meta-data describing the aspects, as well as activities, events, and people related to the aspect. This information can then be used as input to the modules in the analytics engine, e.g., among others, to identify outliers and predict future trends. The query module 316 can cause results of the query search and a representation aspect to be presented to the user. An example of such a presentation is represented and discussed below relative to FIG. 5.

Topic analysis module 318 can generate summarizations of aspects of the software development project. In some implementations, the topic analysis module can use the formal algorithm known in the natural language processing literature as "Topic Analysis" that is specific to analyzing natural text such as descriptions in bug reports, source code change messages (e.g., change descriptions), or requirements documents, and can quickly summarize and categorize the contents of a number of individual passages that would be prohibitive to do manually (for instance, all of the bug reports logged against the operating system in the last 6 months).

The summarization can highlight or emphasize interesting features of the aspects and reduce or eliminate less meaningful information. Summaries can relate to aspects of the software development project, such as projects, people, binaries, components, files, methods, change sets (e.g., patches) etc. The summaries can include trends of key indicators or parameters, such as lines of code, churn, bugs opened, bugs closed, development activity, predictions on how the indicators will develop, and/or activity related to aspects. For example, the activity could be check-ins to the source code. Here the summarization could be discussion topics during development, which can then be related to other activities or parameters, e.g., among others churn, lines of code, bugs opened, bugs closed. Events such as check-ins to the version control, new bug reports, and discussions or documentation or any other aspect that includes natural language can for example be summarized with bag-of-word models or latent topic analysis. If training of a model is necessary it can be trained either manually or with historic data.

In some implementations, the topic analysis module 318 can automatically identify and describe aspects, such as artifacts and development activities. Topic analysis can cluster text (for example, check-in messages, comments, bug reports, etc.) from the data warehouse 204 based on similarity into groups, for example by using latent topic models or other text clustering techniques. These groups can be used to describe artifacts and activities in different dimensions (each group corresponds to one dimension). The topic analysis module 318 can also predefine certain groups based on known categories; for example, reliability, performance, quality, readability, etc.

Alternatively or additionally to the above described functionality, topic analysis module 318 can use a variant of sentiment analysis to identify if text has a positive or negative meaning within the group. The analytics engine can then aggregate this information and present it to the user. One such example is described below relative to FIG. 6. (In FIG. 6, an aspect has been summarized into three dimensions: performance 604, reliability 606, and quality 608; the horizontal bars indicate the result of the sentiment analysis. For each dimension the user can display comments 610, 612 related to the dimension.)

Outlier analysis module 320 can detect parameter changes in the data in the data warehouse that may be of interest to the user. For instance, the outlier analysis module can automatically identify interesting data points and related summaries of activities and aspects that relate to these points. The outlier analysis module can use (but is not limited to) standard statistical techniques such as time series analysis, regression, machine learning, and/or distribution comparison to identify key events, time periods, architectural components, or software teams that stand out from the background population in a statistically significant way. That is, these are events that standard statistical tests (such as a t-test, chi-square test, Kolmogorov test, or a significance test on a regression variable representing a time period) would show as being statistically different from the rest of the values for a particular parameter.

Figure 7:
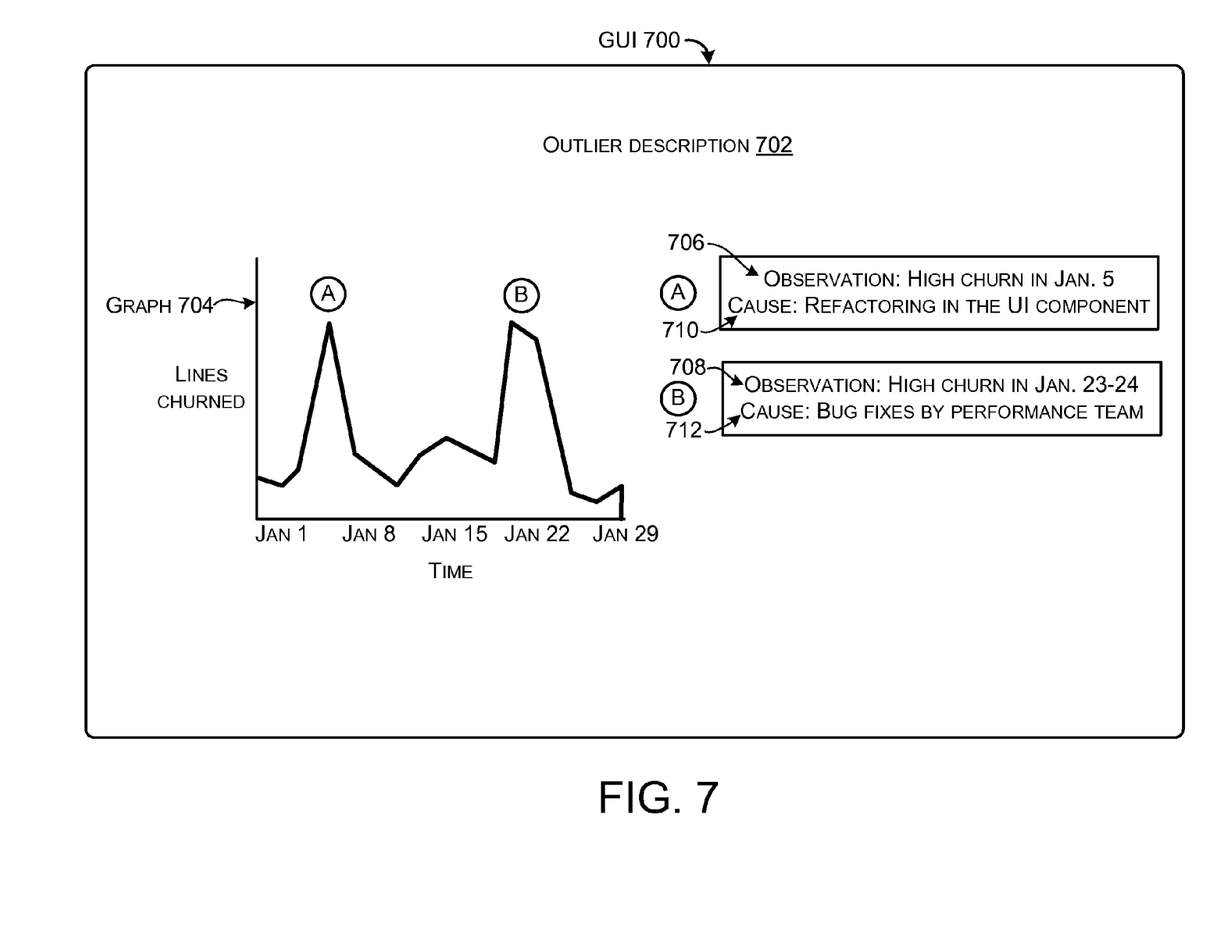

In one configuration, the outlier analysis module 320 can work cooperatively with the prediction analysis module 322 to detect and present past, current, and/or future points of interest for the user. (FIG. 7 shows an example of a representation of outliers detected by the outlier analysis module.) The outlier analysis can detect values that are deemed unlikely based on previous values of the parameter. Implementations of the outlier analysis can be based on variants of regression analysis, nearest neighbor techniques as well as mean, standard deviation, and interquartile range of previous values. Another implementation uses the prediction analysis module 322 to predict a value for a parameter and reports an outlier if the actual value derives by a certain percentage from the predicted values. The percentage can either be specified manually by the stakeholder or learned automatically based on previous data.

Prediction analysis module 322 can predict effects of data that is newly added to the data warehouse. In some configurations, the prediction analysis module offers a speculative feature in that it can operate upon data before the data is actually added to the data warehouse (e.g., committed to the program code). For instance, assume that the user makes some changes to the program code or writes some new code. The user then wants to decide whether to commit the changes/new code to the program code. The changes/new code could be added to a supplemental portion of the data warehouse or otherwise made accessible to the analytics engine. The prediction analysis module could evaluate the changes/new code with the existing data of the data warehouse to determine potential affects that the changes/new code could have on the software development project. The user can utilize the potential affects to make an informed decision whether or not to commit the changes/new code to the software code. Implementations of the prediction analysis module can be based on variants of linear regression, logistic regression, nearest neighbor, decision trees, support vector machines, naïve bayes, and/or latent topic analysis, among others. Still other implementations of the prediction analysis module can use traditional machine learning techniques for prediction, including linear and logistic regression, decision trees, naïve bayes classifiers, support vector machines, and k-means clustering. These techniques can use historical data from the data warehouse to learn a statistical model or trend based on one or more parameters. They can then predict future events or trends based on more recent values for these parameters.

Actions module 324 can be configured to allow the user to interact with the functionalities provided by the other modules to get the information that he/she wants. For instance, the actions module can, such as through a GUI, allow the user to drill down into the details regarding an individual aspect. The actions module can also allow the user to benchmark individual parameters and/or aspects. The actions module can allow the user to segment individual aspects and/or parameters. For instance, the user may want to see overall churn and then churn for specific time periods and/or for specific teams of programmers. The actions module can also allow the user to have the prediction module evaluate the changes/new code as mentioned above. Thus, from one perspective the actions module 324 can be thought of as facilitating communications between the user and the query module 316, the topic analysis module 318, the outlier module 320, and the prediction analysis module 322. For instance, the user may enter a query about the software development project. The actions module can receive the query and pass the query to the query module 316. The query module can search the data warehouse for the query and return results to the actions module. The actions module can present the results to the user.

The actions module 324 can also translate requests by the user (e.g., selecting aspects, drill down into information, among others) into queries that it sends to the data warehouse.

The actions module then calls the appropriate aspect identification modules with the result of the query and displays the results to the user. The user may want to drill down on certain parameters of the query results and enters such a request. The actions module can then facilitate the request on behalf of the user with the other modules and present the results.

To summarize, whenever the user performs an action in the GUI, e.g., selects an aspect or drills down into information, the actions module 324 can send a query to the data warehouse, call the appropriate aspect identification modules, and then present the results.

The analytics engines 310 can be acquired in various ways. For instance, the analytics engine can be pre-installed on the computer by a manufacturer or an intermediary that prepares and/or sells the computer to an end user (e.g., customer). In other scenarios, the analytics engine may be available for installation by the end user. For instance, the user could obtain the analytics engine on external storage 306 and install the analytics engine on the computer. Such a configuration is illustrated relative to analytics engine 310(2) that can be stored on external storage 306 and installed onto computer 302(2). In another scenario, the user may obtain the analytics engine from a network source, such as from cloud environment 308. In still another configuration, represented by computer 302(3), the computer may access a remote analytics engine, such as analytics engine 310(3) maintained in the cloud environment 308. In an instance where the analytics engine is resident on the computer, the data warehouse 204 may also be resident on the computer or the computer can access the data warehouse via the network. For instance, computer 302(1) includes both analytics engine 310(1) and data warehouse 204(1). In contrast, computer 302(2) includes analytics engine 310(2) which can access the data warehouse, such as data warehouse 204(2) over network 304.

Generally, any of the functions described herein can be implemented using software, firmware, hardware (e.g., fixed-logic circuitry), manual processing, or a combination of these implementations. The term "engine", "tool", "component", or "module" as used herein generally represent software, firmware, hardware, whole devices or networks, or a combination thereof. In the case of a software implementation, for instance, these may represent program code that performs specified tasks when executed on a processor (e.g., CPU or CPUs). The program code can be stored in one or more computer-readable memory devices, such as computer-readable storage media. The features and techniques of the component are platform-independent, meaning that they may be implemented on a variety of commercial computing platforms having a variety of processing configurations.

As used herein, the term "computer-readable media" can include transitory and non-transitory instructions. In contrast, the term "computer-readable storage media" excludes transitory instances. Computer-readable storage media can include "computer-readable storage devices". Examples of computer-readable storage devices include volatile storage media, such as RAM, and non-volatile storage media, such as hard drives, optical discs, and flash memory, among others.

SECOND SYSTEM ARCHITECTURE EXAMPLE

Figure 4:
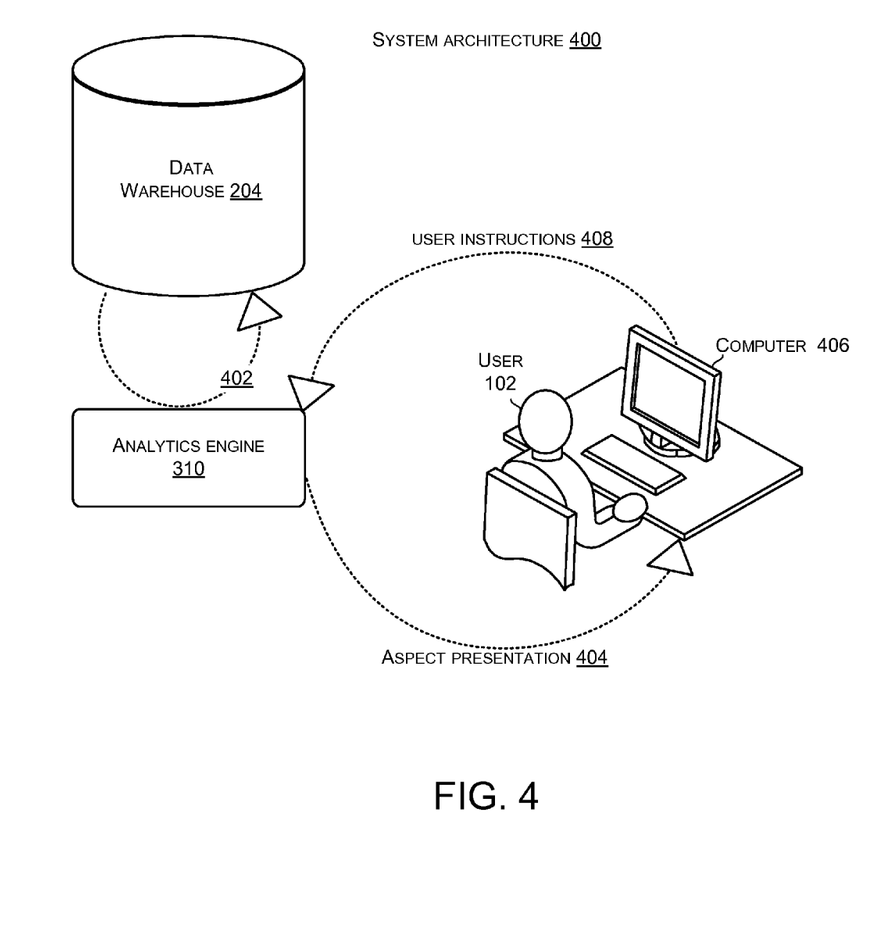
FIG. 4 shows another example system architecture for accomplishing automated software project development analytics in accordance with some implementations of the present concepts.

FIGS. 4-8 collectively expand upon some of the concepts introduced above relative to FIGS. 1-3. FIG. 4 shows another example of a system architecture 400. FIGS. 5-8 show examples of screen shots of graphical user interfaces that can be generated by the system architecture of FIG. 2 or 4 or the system of FIG. 3.

As shown in FIG. 4 and as introduced above, an analytics engine 310 can access a data warehouse 204 and identify aspects of the software development project that are of potential interest as indicated at 402. The aspects can relate to, and/or provide, a wide variety of information and features, such as summary information, automatic descriptions of aspects and development activity, automatically identified points of interest, benchmarking and comparison of data (includes segmenting of data), and/or analysis of change sets.

One or more of the aspects can be presented to the user at 404. For instance, the analytics engine 402 can cause the aspects to be presented on the user's computer 406. The user 102 can view the presented aspects and request further actions (e.g., user instructions 408). For instance, the user may want more detail about an individual aspect or the user may want to view another aspect. For instance, the user can choose aspects based on the decision that he/she is about to make. Different decisions might be aided by different information. For instance, if reliability is relatively high and trending upward, the user may want to reallocate some programmers from fixing bugs to working on new product features. The analytics engine 310 can access the data warehouse 204 to satisfy the user's instructions. The process can be repeated until the user is satisfied. For example, assume that the software development project relates to a program called "BINARY FOO.DLL". Further assume that the user instructions request a summary of recent trends relative to the program. (Summary information is designated at 110 in FIG. 1).

SCREENSHOT EXAMPLES

Figure 5:
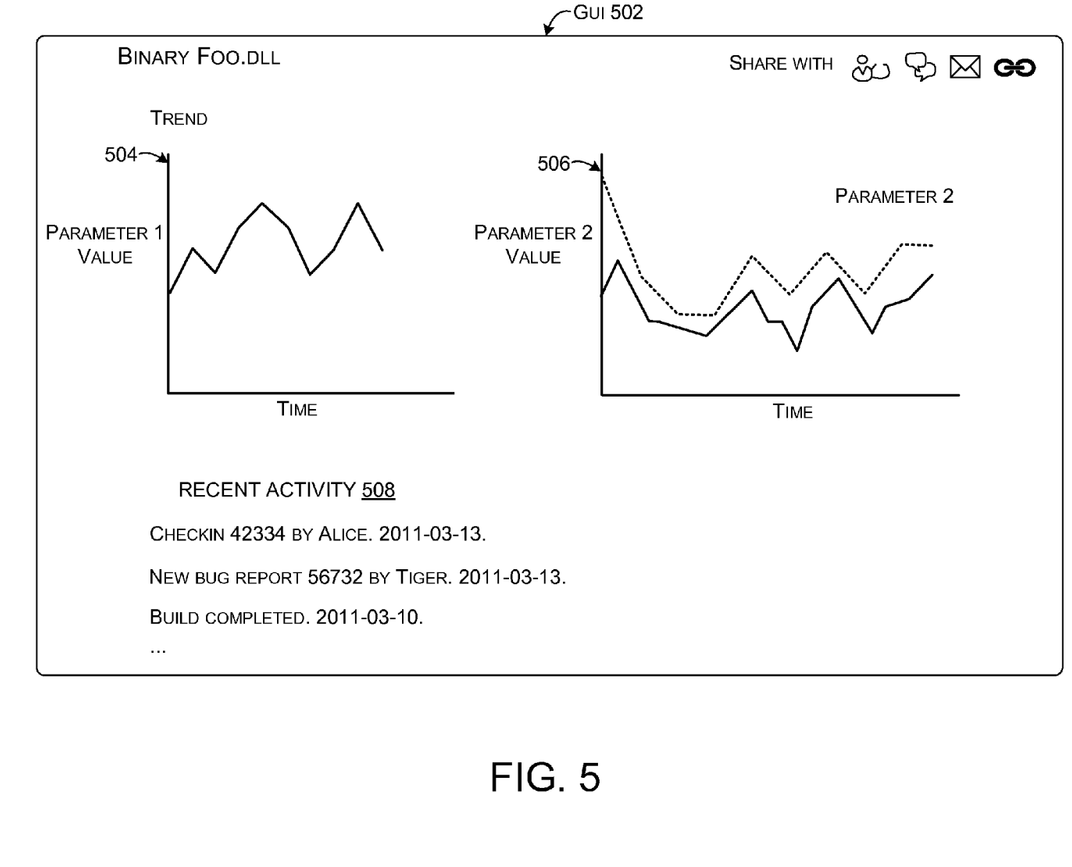
FIGS. 5-8 show screenshots of graphical user interfaces that can be generated by automated software project development analytics in accordance with some implementations of the present concepts.

FIG. 5 is a GUI 502 generated responsive to the user request for a trend summarization of software development project "BinaryFoo.dll". The GUI shows two graphs 504 and 506 related to summaries of trends of the software development project. Graph 504 relates to a first parameter associated with a first trend. Graph 506 relates to a second parameter associated with a second trend. In addition to graphs 504 and 506, the GUI shows recent activity 508 from the data warehouse 204 that summarizes comments found in non-code data that are determined to be descriptive of recent trends of the software development project.

Figure 6:
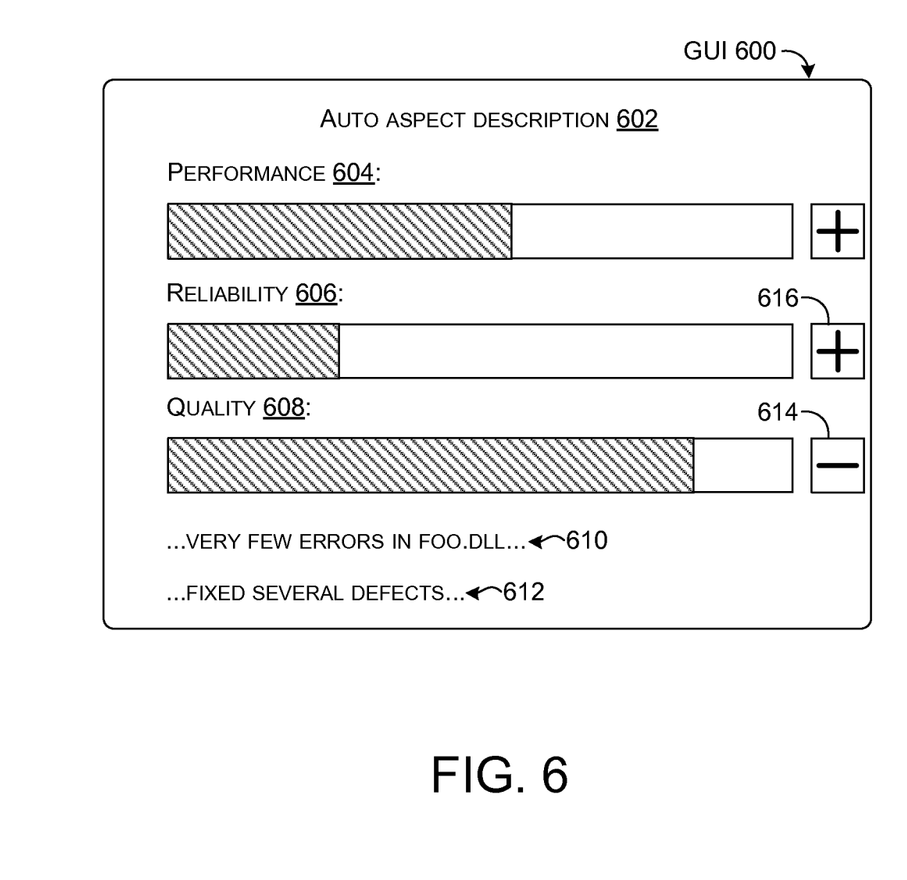

FIG. 6 shows an example GUI 600 that includes automatically detected aspect descriptions 602. GUI 600 can be similar to GUI 128 of FIG. 1, but in this instance, offers additional detail. In this case, the automatic aspect description conveys values of a performance aspect 604, a reliability aspect 606, and a quality aspect 608. Each of the aspects 604-608 is shown as a horizontal bar graph. On the bar graphs, the cross-hatched portions represent positive meaning associated with data that relates to the individual aspects. Thus, a cross-hatched portion of performance aspect 604 that extended all the way across the graph would indicate 100% positive meaning associated with the data that relates to the performance aspect. Stated another way, in such a scenario, all data associated with performance would be positive (e.g., no negative connotations). In contrast, no cross-hatching would indicate all negative comments.

In this example, further detail is provided relative to the quality aspect 608. The further detail is manifest as text entries 610 and 612. The presented text entries 610 and 612 are intended to be representative of data identified as relating to the quality aspect 608. The user can see less detail about the quality aspect 608 by clicking on the minus ("−") arrow indicated at 614. Similarly, the user can see more detail about the reliability aspect 606 by clicking on the plus ("+") arrow indicated at 616.

To summarize, the analytics engine 310 can use a variant of sentiment analysis to identify if text has a positive or negative meaning. The analytics engine can then aggregate this information and present it to the user. For example in FIG. 6, text related to quality has mostly positive meaning, while text related to reliability has mostly negative meaning (as indicated by the length of the hashed bar).

FIG. 7 shows another example GUI 700 that includes automatically detected outlier descriptions 702. In this case, the outlier description includes a graph 704 of a churn parameter. The graph represents lines churned over time in days. Two outliers are indicated in the graph as "A" and "B". In this case, the outliers are peaks on the graph. In other instances, the outliers may be valleys, discontinuities, slope changes, trend changes, difference changes, and/or other manifestations. Outlier description 702 also includes a textual description of the outliers. In this case, at 706, the description of outlier "A" indicates that a high churn rate was observed on January 5th. Similarly, at 708, the description of outlier "B" indicates that a high rate of churn was observed on January 23-24. Also, the outlier description offers a potential explanation for outlier "A". In this case, at 710 the cause of the high churn of January 5 is indicated as "Refactoring of the UI component". Similarly, at 712, the cause of the high churn of outlier "B" is indicated as "Bug fixes by the performance team". The description of outliers can be mined by correlating the outliers with events and activities (among others, check-ins, bug reports, discussion) during the software development. Thus, this implementation presents outliers to the user and also presents potential causes of the outliers. The combination of these two pieces of information can be useful to the user in making development decisions.

Figure 8:
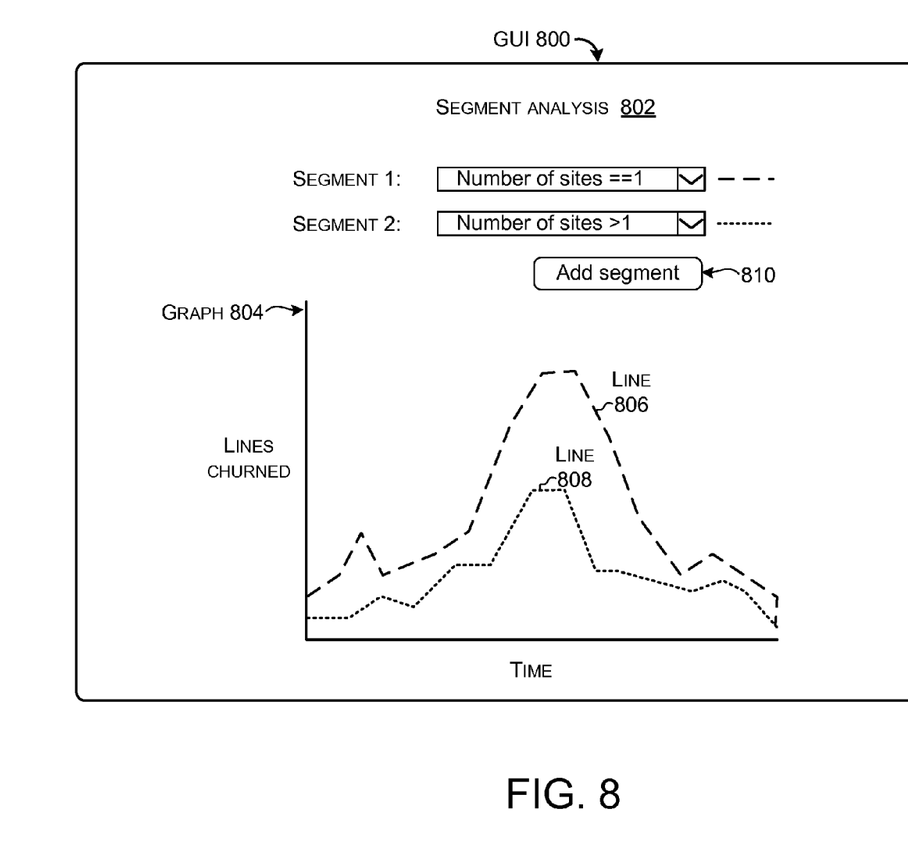

FIG. 8 shows another example GUI 800 that illustrates segment analysis 802. Segment analysis can allow the user to separate an aspect based upon a parameter. In this case, segment analysis is applied to a graph 804 that conveys churn as lines churned over time. Further, the user has stipulated that churn be distinguished based upon the parameter team location. Thus, in this example, churn produced by a team at a single site (co-located development) is represented on graph 804 by a dashed line 806. Churn produced by teams across multiple sites (distributed development) is represented by a dotted line 808. GUI 800 can also allow the user to define further parameters upon which to segment the churn graph at 810.

In summary several examples of how the automated software development analytics can be surfaced to the user are presented above. The user can utilize the surfaced analytics information to make informed decisions about the software development project.

METHOD EXAMPLE

Figure 9:
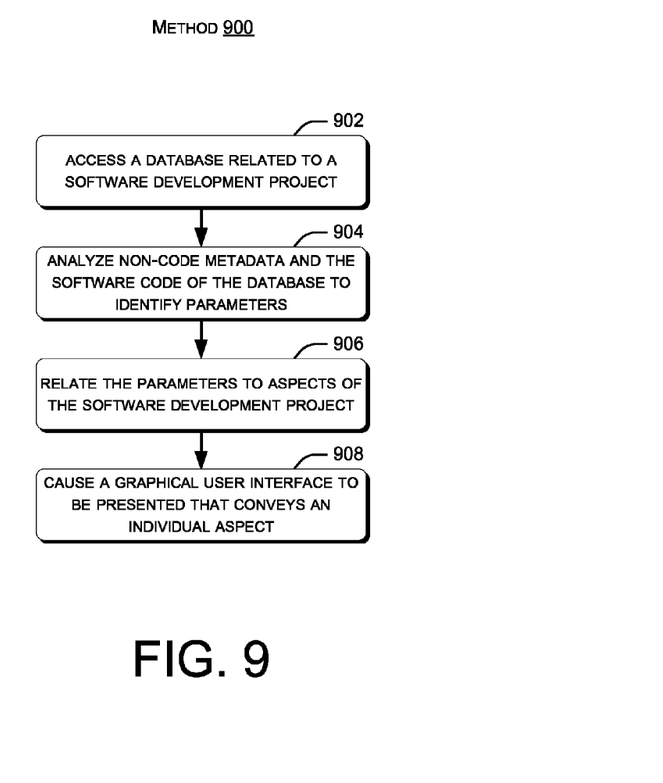
FIG. 9 shows a flowchart of an automated software project development analytics method in accordance with some implementations of the present concepts.

FIG. 9 illustrates a flowchart of an automated software development analytics technique or method 900.

At block 902, the method can access a database related to a software development project. The database can include both software code and non-code metadata.

At block 904, the method can analyze the non-code metadata and the software code of the database to identify parameters.

At block 906, the method can relate the parameters to aspects of the software development project.

At block 908, the method can cause a graphical user interface to be presented that conveys an individual aspect.

The order in which the method 900 is described is not intended to be construed as a limitation, and any number of the described blocks can be combined in any order to implement the method, or an alternate method. Furthermore, the method can be implemented in any suitable hardware, software, firmware, or combination thereof, such that a computing device can implement the method. In one case, the method is stored on a computer-readable storage media as a set of instructions such that execution by a computing device causes the computing device to perform the method.

Conclusion

Although techniques, methods, devices, systems, etc., pertaining to automated software development analytics are described in language specific to structural features and/or methodological acts, it is to be understood that the subject matter defined in the appended claims is not necessarily limited to the specific features or acts described. Rather, the specific features and acts are disclosed as exemplary forms of implementing the claimed methods, devices, systems, etc.

The invention claimed is:

1. One or more computer-readable storage media having instructions stored thereon that, when executed by a computing device, cause the computing device to perform acts, comprising:

accessing a database related to a software development project, wherein the database includes both software code and non-code metadata;

analyzing the non-code metadata and the software code to identify parameters and value changes to individual parameters, wherein the individual parameters represent a quantitative metric, a categorization, or a nominal value of a measurement or analysis of raw data from the database;

relating the parameters to aspects of the software development project;

causing a graphical user interface to be presented that simultaneously conveys at least two of the aspects of the software development project; and, responsive to receiving a user selection of an individual aspect from the graphical user interface, presenting another graphical user interface that includes a chart that shows details relating to the individual aspect and text that relates to the chart, and wherein the another graphical user interface allows the user to request a visualization of another different chart that includes specific individual parameters that contribute to the individual aspect, and wherein the visualization of the specific individual parameters comprises a description relating to individual value changes on the another different chart.

2. The computer-readable storage media of claim 1, wherein the aspects comprise artifacts or points of interest.

3. The computer-readable storage media of claim 1, wherein the software development project comprises multiple subsequent versions of an operating system or an application.

4. The computer-readable storage media of claim 1, wherein the non-code metadata includes at least one of: change descriptions, bug reports, documentation of the software code, email relating to the software development project, requirements of the software development project, discussion of the software development project, or test data relating to the software development project.

5. The computer-readable storage media of claim 1, wherein the causing comprises causing the graphical user interface to be presented that simultaneously conveys all of the aspects of the software development project.

6. The computer-readable storage media of claim 5, wherein the description includes text.

7. The computer-readable storage media of claim 1, wherein the accessing, analyzing, relating, and causing are performed prior to the user selection.

8. A computer-implemented method, comprising:
- identifying parameters from program code of a software development project and metadata associated with the software development project, wherein the parameters are associated with aspects of the software development project and represent a quantitative metric, a categorization, or a nominal value of a measurement or analysis of raw data from the software development project;
- automatically tracking values of the parameters;
- detecting an instance where changes to the values of an individual parameter are indicative of a point of interest for an associated individual aspect;
- causing a graphical user interface to be generated that presents the associated individual aspect and the point of interest for a user and wherein the graphical user interface further allows the user to select a visualization of the individual parameter contributing to the point of interest, wherein the visualization comprises a chart of the individual parameter and associated description; and,
- generating an explanation for the changes to the values of the individual parameter and presenting the explanation as the associated description related to the chart.

9. The computer-implemented method of claim 8, wherein the detecting comprises detecting a slope change in the values of the individual parameter, a trend change in the values of the individual parameter, or a difference change in the values of the individual parameter.

10. The computer-implemented method of claim 8, wherein the automatically tracking is performed periodically.

11. A system, comprising:
- a display device;
- a data correlation module configured to access a database of software code and metadata related to a software development project and to identify individual instances of the software code or the metadata that relate to parameters of the software development project, wherein the parameters represent a quantitative metric, a categorization, or a nominal value of a measurement or analysis of raw data from the software development project;
- an aspect identification module configured to relate individual parameters to aspects of the software development project and to detect an instance where changes to values of the individual parameters are indicative of a change to an individual aspect, the aspect identification module further configured to cause the change to the individual aspect to be presented on a graphical user interface on the display device and wherein the graphical user interface is configured to allow a user to cause the aspect identification module to cause another graphical user interface to be displayed that reflects details about the individual parameters via a chart of at least one of the individual parameters and associated description relating to the chart, wherein the associated description includes an explanation for the changes of the values of the individual parameters; and,
- a processor coupled to the display and configured to execute the data correlation module and the aspect identification module.

12. The system of claim 11, wherein the data correlation module is further configured to search the database for a query.

13. The system of claim 12, wherein the query is user-defined or defined by the aspect identification module.

14. The system of claim 11, wherein the aspect identification module is further configured to present the change in a summarized form.

15. The system of claim 11, further comprising the database of software code and metadata.

16. The system of claim 15, wherein the display device, the database, the data correlation module, and the aspect identification module are manifest on a single computer.

17. The system of claim 11, wherein the aspect identification module comprises one or more of: a query module, a topic analysis module, an outlier analysis module, or a prediction analysis module.

* * * * *